United States Patent
Sun et al.

(10) Patent No.: US 10,270,089 B2
(45) Date of Patent: Apr. 23, 2019

(54) CATHODE ACTIVE MATERIAL FOR LITHIUM BATTERY AND METHOD OF MANUFACTURING THE SAME

(71) Applicant: IUCF-HYU(INDUSTRY-UNIVERSITY COOPERATION FOUNDATION HANYANG UNIVERSITY), Seoul (KR)

(72) Inventors: Yang-Kook Sun, Seoul (KR); Sung June Youn, Busan (KR); Sang Hyuk Lee, Busan (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 281 days.

(21) Appl. No.: 14/954,226

(22) Filed: Nov. 30, 2015

(65) Prior Publication Data

US 2016/0156030 A1 Jun. 2, 2016

Related U.S. Application Data

(63) Continuation of application No. PCT/KR2014/004902, filed on Jun. 2, 2014.

(30) Foreign Application Priority Data

May 31, 2013 (KR) .................. 10-2013-0062897
Jun. 2, 2014 (KR) .................. 10-2014-0067260

(51) Int. Cl.
H01M 4/36 (2006.01)
H01M 4/525 (2010.01)
(Continued)

(52) U.S. Cl.
CPC ............ *H01M 4/366* (2013.01); *C01G 53/44* (2013.01); *H01M 4/131* (2013.01);
(Continued)

(58) Field of Classification Search
CPC ......... H01M 10/0525; H01M 2220/20; H01M 2220/30; H01M 4/131; H01M 4/1391;
(Continued)

(56) References Cited

U.S. PATENT DOCUMENTS

2003/0087155 A1   5/2003 Cho et al.

FOREIGN PATENT DOCUMENTS

CN    1414650 A    4/2003
EP    0872450 A1   10/1998
(Continued)

OTHER PUBLICATIONS

H.-J. Noh, S.-T. Myung, H.-G. Jung, H. Yashiro, K. Amine, Y.-K. Sun. Formation of a Continuous Solid-Solution Particle and its Application to Rechargeable Lithium Batteries, Adv. Funct. Mater. 2013, 23, 1028-1036.*

(Continued)

*Primary Examiner* — Carlos Barcena
(74) *Attorney, Agent, or Firm* — Sughrue Mion, PLLC

(57) ABSTRACT

A cathode active material for a lithium secondary battery is provided which comprises a first region and a second region. The first region is represented by Chemical Formula1 wherein M1, M2 and M3 are constant: $Li_{a1}M1_{x1}M2_{y1}M3_{z1}O_{2+\delta}$. The second region is formed around the first regions and is represented by Chemical Formula 2 $Li_{a2}M1_{x2}M2_{y2}M3_{z2}M4_wO_{2+\delta}$. The concentrations of M1, M2 and M3 are changed from Chemical Formula 1. In both Chemical Formula 1 and 2, M1, M2 and M3 is selected from a group including Ni, Co, Mn and combinations thereof, M4 is selected from a group including (Continued)

Fe, Na, Mg, Ca, Ti, V, Cr, Cu, Zn, Ge, Sr, Ag, Ba, Zr, Nb, Mo, Al, Ga, B and combinations thereof, $0<a1\leq1.1$, $0<a2\leq1.1$, $0\leq x1\leq1$, $0\leq x2\leq1$, $0\leq y1\leq1$, $0\leq y2\leq1$, $0\leq z1\leq1$, $0\leq z2\leq1$, $0<w\leq0.1$, $0.0\leq\delta\leq0.02$, $0<x1+y1+z1\leq1$, $0<x2+y2+z2\leq1$.

16 Claims, 10 Drawing Sheets

(51) Int. Cl.

| | |
|---|---|
| *H01M 4/54* | (2006.01) |
| *H01M 4/485* | (2010.01) |
| *H01M 4/505* | (2010.01) |
| *H01M 10/0525* | (2010.01) |
| *C01G 53/00* | (2006.01) |
| *H01M 4/131* | (2010.01) |
| *H01M 4/1391* | (2010.01) |

(52) U.S. Cl.
CPC ......... *H01M 4/1391* (2013.01); *H01M 4/362* (2013.01); *H01M 4/485* (2013.01); *H01M 4/505* (2013.01); *H01M 4/525* (2013.01); *H01M 4/54* (2013.01); *H01M 10/0525* (2013.01); *H01M 2220/20* (2013.01); *H01M 2220/30* (2013.01)

(58) Field of Classification Search
CPC ...... H01M 4/362; H01M 4/366; H01M 4/485; H01M 4/505; H01M 4/525; H01M 4/54
See application file for complete search history.

(56) References Cited

FOREIGN PATENT DOCUMENTS

| | | |
|---|---|---|
| KR | 1020050083869 A | 8/2005 |
| KR | 1020120079801 A | 7/2012 |
| KR | 1020120121235 A | 11/2012 |
| KR | 101215829 B1 | 12/2012 |
| KR | 1020130001703 A | 1/2013 |
| KR | 1020130010341 A | 1/2013 |
| WO | 2007/114557 A1 | 10/2007 |
| WO | 2012/093797 A2 | 7/2012 |

OTHER PUBLICATIONS

Y.-K. Sun, S.-T. Myung, B.-C. Park, J. Prakash, I. Belharouak, K. Amine. High-energy cathode material for long-life and safe lithium batteries, Nature Materials, vol. 8, Apr. 2009, 320-324.*
Y.-K. Sun, D.-H. Kim, H.-G. Jung. S.-T. Myung, K. Amine. High-voltage performance of concentration-gradient Li[Ni0.67Co0.15Mn0.18]O2 cathode material for lithium-ion batteries, Electrochimica Acta 55 (2010) 8621-8627.*
Y.-K. Sun. H.-J. Noh, C. S. Yoon. Effect of Mn Content in Surface on the Electrochemical Properties of Core-Shell Structured Cathode Materials, Journal of the Electrochemical Society, 159 (1) A1-A5 (2012).*
Z. Chen, D.-J. Lee, Y.-K. Sun, K. Amine. Advanced cathode materials for lithium-ion batteries, Materials Research Society (MRS) Bulletin, vol. 36, Jul. 2011.*
Y.-K. Sun, D.-H. Kim, C. S. Yoon, S.-T. Myung, J. Prakash, K. Amine. A Novel Cathode Material with a Concentration-Gradient for High-Energy and Safe Lithium-Ion Batteries, Adv. Funct. Mater. 2010, 20, 485-491.*
S.-T. Myunga, K.-S. Lee, Y.-K. Sun, H. Yashiro. Development of high power lithium-ion batteries: Layer Li[Ni0.4Co0.2Mn0.4]O2 and spinel Li[Li0.1Al0.05Mn1.85]O4, Journal of Power Sources 196 (2011) 7039-7043.*
Nanostructured high-energy cathode materials for advanced lithium batteries, Yang-Kook Sun et al., Nature Materials, vol. 11, Nov. 2012, www.nature.com/naturematerials, p. 942-947.
A novel concentration-gradient Li[Ni 0.83 Co 0.07 Mn 0.10]O2 cathode material for high-energy lithium-ion batteries, Yang-Kook Sun et al., J. Master. Chem., 2011, vol. 21, p. 10108-10112.
International Search Report dated Oct. 15, 2014 for Application No. PCT/KR2014/004902 with English translation.

* cited by examiner

CATHODE ACTIVE MATERIAL FOR LITHIUM BATTERY AND METHOD OF MANUFACTURING THE SAME

CROSS-REFERENCE TO RELATED APPLICATIONS

This application is a continuation of International Application No. PCT/KR2014/004902 filed on Jun. 2, 2014, which claims priority from Korean Patent Application No. 10-2013-0062897 filed with Korean Intellectual Property Office on May 31, 2013 and Korean Patent Application No. 10-2014-0067260 filed with Korean Intellectual Property Office on Jun. 2, 2014, the entire contents of which are incorporated herein by reference.

BACKGROUND

1. Field

The present disclosure relates to cathode active material for lithium batteries and a method of manufacturing the same, and more specifically relates to cathode active material for manufacturing lithium batteries which is doped by different metal and has gradient concentration and a method of manufacturing the same.

2. Description of Related Art

Recently, as utilization of portable electronic appliances such as camcorders, mobile phones, notebook PCs are generalized by rapid development of electronic, communication and computer industries, requirement for light batteries with long life and high reliability is elevated. Particularly, the requirement of the lithium secondary battery are increased day by day as power source for driving these portable electronic information communication devices because the lithium secondary batteries have driving voltage over 3.7 V and energy density per unit weight higher than nickel-cadmium batteries or nickel-hydrogen batteries.

Recently, studies about power sources for electric vehicles in hybrid an internal combustion engine and the lithium secondary battery are lively progressed in America, Japan, Europe and etc. A development for P-HEV (Plugin Hybrid Electric Vehicle) battery used for vehicles capable of less than 60 mile distance covered in a day are lively progressed around America. The P-HEV battery has characteristics little short of electric vehicle thereby the greatest problem is development of high capacity battery. Particularly, the greatest problem is development of a cathode material having high tab density over 2.0 g/cc and high capacity property over 230 mAh/g.

Cathode materials in common use or development are $LiCoO_2$, $LiNiO_2$, $LiMnO_2$, $LiMn_2O_4$, $LiFePO_4$ and etc. $LiCoO_2$ is a material having stable charge/discharge characteristics, superior electron conductivity, high battery voltage, high stability and flat discharge voltage property. However, cobalt (Co) is rare in deposits and expensive, in addition that, it has toxicity to human thereby requiring development for other cathode materials. Further, these have weakness of deteriorated thermal property because crystal structure is unstable by delithiation in charging.

To improve these problems, a lot of attempts in which transition metal element replaces for a part of nickel are trying in order to shift heat generation starting temperature to high temperature portion or make heat peak broaden for preventing rapid heat generation. However, satisfaction has not been acquired yet.

In other words, $LiNi_{1-x}Co_xO_2$ (x=0.1–0.3) material in which cobalt substitutes for a portion of nickel shows superior charge/discharge property and cycle life characteristics, however, thermal stability problem is not solved. In addition, Europe Patent No. 0872450 discloses $Li_aCo_bMn_cM_dNi_{1-(+c+d)}O_2$ (M=B, Al, Si. Fe, Cr, Cu, Zn, W, Ti and Ga) type in which another metal as well as cobalt and manganese substitute for nickel locations, however, thermal stability problem is also not solved To remove these weak points, Korea Patent Publication No. 10-2005-0083869 suggests lithium transition metal oxide showing concentration gradient of metal composition. In this method, interior material of predetermined composition is synthesized and coated by a material with different composition to be double layer followed by mixing with lithium salt and performing thermal treatment. Lithium transition metal oxide which is commercially available may be used as the interior material. However, this method has a problem of unstable interior structure because metal composition of cathode active material between the inner material and outer material is discontinuously changed. Further, Ni content in transition metal should be increased for acquiring high capacitance in cathode active material of layered system, however, structural stability in charging is relatively lower than other transition metals such as manganese and oxygen and electrolyte effluent from electrode material are reacted each other and high exothermic reaction is occurred at relative low temperature when battery temperature are elevated by internal short if nickel content is high, thereby existing dangerous of battery burning and blowout.

SUMMARY

Embodiments of the inventive concepts may provide cathode active materials for lithium batteries showing concentration gradient by different metal different metal doping.

Embodiments of the inventive concepts may further provide methods of cathode active materials for lithium batteries.

Embodiments of the inventive concept provide a cathode active material for a lithium secondary battery comprising: a first region represented by following Chemical Formula 1, wherein concentrations of M1, M2 and M3 are constant and wherein radius from the center of the first region is R1; and a second region formed around the first region, wherein thickness of the second region is D2, and wherein concentrations of M1, M2, M3 and M4 are changed from the composition shown in the Chemical Formula 1 into the composition shown in following Chemical Formula 2, thereby the second region shows composition of the Chemical Formula 2 at the outer shell.

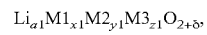   [Chemical Formula 1]

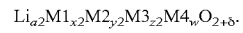   [Chemical Formula 2]

(In Chemical Formula 1 and Chemical Formula 2, M1, M2 and M3 is selected from a group including Ni, Co, Mn and combinations thereof, M4 is selected from a group including Fe, Na, Mg, Ca, Ti, V, Cr, Cu, Zn, Ge, Sr, Ag, Ba, Zr, Nb, Mo, Al, Ga, B and combinations thereof, $0<a1\leq1.1$, $0<a2\leq1.1$, $0\leq x1\leq1$, $0\leq x2\leq1$, $0\leq y1\leq1$, $0\leq y2\leq1$, $0\leq z1\leq1$, $0\leq z2\leq1$, $0\leq w\leq0.1$, $0.0\leq\delta\leq0.02$, $0<x1+y1+z1\leq1$, $0<x2+y2+z2\leq1$ and $0\leq R1\leq0.5$ μm, $0\leq D2\leq0.5$ μm).

In some embodiments, M4 may show concentration gradient in at least a portion of a particle.

In other embodiments, M4 may show concentration gradient from a portion of the second region to the outer shell of the second region.

In still other embodiments, the concentration of M4 may be increasing as going to the outer shell of the second region from a portion of the second region.

In yet other embodiments, X1=x2, y1≤y2 and z1≤z2.

In yet still other embodiments, X1≠X2, y1≠y2 and z1≠z2.

In further embodiments, the concentration gradients of M1, M2 and M3 may be constant in the second region.

In still further embodiments, the second region may include a region M1-1 and a region M1-2 of which concentration gradients of M1 are different from each other.

In still further embodiments, the second region may include a region M3-1 and a region M3-2 of which concentration gradients of M3 are different from each other.

In even further embodiments, the second region may be a region M2-1 and a region M2-2 of which concentration gradients of M2 are different from each other.

In other embodiments of the inventive concept, the cathode active material may further include a third region formed around the second region, wherein thickness of the third region is D3, wherein the third region is represented by following chemical formula 3, and wherein concentrations of M1, M2 and M3 are constant in the third region.

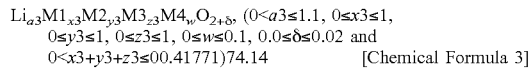
Li$_{a3}$M1$_{x3}$M2$_{y3}$M3$_{z3}$M4$_w$O$_{2+\delta}$, (0<a3≤1.1, 0≤x3≤1, 0≤y3≤1, 0≤z3≤1, 0≤w≤0.1, 0.0≤δ≤0.02 and 0<x3+y3+z3≤00.41771)74.14    [Chemical Formula 3]

In still other embodiments, concentrations of M1, M2 and M3 in the third region may be the same as concentrations in the outer shell of the second region In even other embodiments, one of M1, M2 and M3 concentration in the third region may be higher than in the outer shell of the second region, one of M1, M2 and M3 concentration in the third region may be lower than in the outer shell of the second region. Mn concentration in the third region may be higher than Mn concentration in the second region and Ni concentration in the third region may be lower than Ni concentration in the second region such that structural stability and high capacitance can be secured.

Other embodiments of the inventive concept provide a cathode active material for a lithium secondary battery in which average composition of total particles are represented by following Chemical Formula 4.

LiaM1$_x$M2$_y$M3$_z$M4$_w$O$_{2+\delta}$,    [Chemical Formula 4]

wherein M1, M2 and M3 is selected from a group including Ni, Co, Mn and combinations thereof, wherein M4 is selected from a group including Fe, Na, Mg, Ca, Ti, V, Cr, Cu, Zn, Ge, Sr, Ag, Ba, Zr, Nb, Mo, Al, Ga, B and combinations thereof, and wherein at least one of M1, M2 and M3 has concentration gradient in at least a portion of the particle.

In some embodiments, at least one of M1, M2 and M3 may show concentration gradient in the whole particle.

In other embodiments, one of M1, M2 and M3 may show constant concentration in the whole particle.

In still other embodiments, M4 may show concentration gradient in at least a portion of the particle.

In yet other embodiments, concentration of M4 may be decreasing as going to the center of the particle from the surface of the particle.

In further embodiments, at least one of M1, M2 and M3 may have concentration gradient in at least a portion of the particle. For example, M1, M2 and M3 may have concentration gradient entirely as going to the surface from the center of the particle. In contrast, M1, M2 and M3 may  maintain constant concentration without changing in at least a portion of particle. For example, concentrations of M1, M3 and M3 may be maintained at constant around the center of the particle but may be changed as going to the surface of the particle. Alternatively, M1, M3 and M3 may have concentration gradient from the center of the particle but may maintain constant concentration in the surface.

In still further embodiments, tangent of the concentration gradient of M1, M2 and M3 may be at least one.

In even further embodiments, at least one of M1, M2 and M3 may have concentration gradient in whole particle. For example, M1 and M2 may have concentration gradient in a portion of the particle, and the M3 may have concentration gradient in whole particle. Alternatively, each of M1, M2 and M3 may have concentration gradient in whole particle.

In yet further embodiments, M4 may have concentration gradient.

In yet still further embodiment, concentration of M4 may be decreasing as going to the center of the particle from the surface of the particle.

In yet even further embodiments, concentration gradient of M4 may exist in surface portion of the particle. In other words, M4 may have concentration gradient to predetermined depth from the surface of the particle, and may not have beneath the depth.

Still other embodiments of the inventive concept provide a method of manufacturing a cathode active material for a lithium secondary battery comprising: a first step of mixing a first metal salt solution, a chelating agent and an alkali solution into a reactor to form a first region, wherein the first metal salt solution includes M1, M2, M3, wherein concentrations of M1, M2 and M3 are constant in the first region, and wherein the first region has radius R1 from the center; a second step of providing the first metal salt solution including M1, M2 and M3 and a second metal salt solution into the reactor by mixing with gradually changing mixture ratio, and simultaneously mixing the chelating agent and the alkali solution into the reactor to manufacture a second region, thereby manufacturing active material precursor, wherein M1, M2 and M3 show concentration gradient in the second region, and wherein thickness of the second region is R2; a third step of mixing the active material precursor, a lithium salt and a different metal oxide solution; and a fourth step of thermal treating.

In some embodiments, the different metal oxide in the fourth step may be selected from a group including MgO, Cr$_2$O$_3$, ZrO$_2$, and Al$_2$O$_3$.

In other embodiments, the method may further include a fifth step of doping the active material by dipping the active material in the different metal solution.

In still other embodiments, the different metal solution in the fifth step may be a solution of metal selected from Mg, Cr, Zr and Al.

BRIEF DESCRIPTION OF THE DRAWINGS

The inventive concept will become more apparent in view of the attached drawings and accompanying detailed descriptions.

DETAILED DESCRIPTION OF THE EMBODIMENTS

Figure 1:
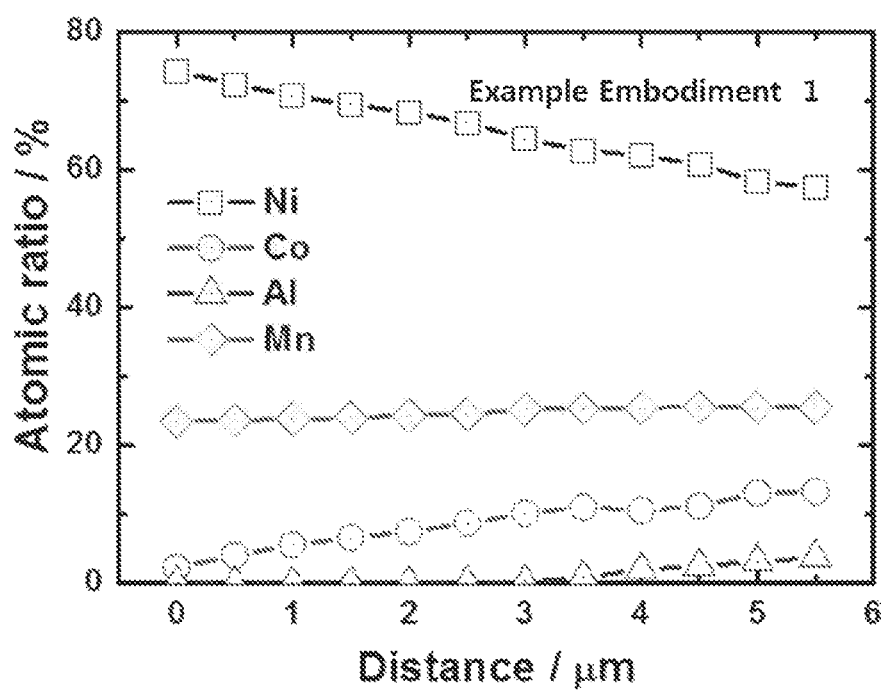
FIGS. 1 and 2 show the concentration ratio of metal ions in cross-section of active material which were manufactured by embodiments of the inventive concept (FIG. 1) and a comparative concept (FIG. 2).

The inventive concept will now be described more fully hereinafter with reference to the accompanying drawings, in which embodiments of the inventive concept are shown. It should be noted, however, that the inventive concept is not limited to the following embodiments, and may be implemented in various forms.

Example Embodiment 1

In order to make an active material coated by aluminum, in which nickel concentration is continuously decreasing as going to the surface from the center, and cobalt and manganese concentration is increasing as going to the surface from the center, first of all, 2.4M first metal salt solution in which nickel sulfate: cobalt sulfate:manganese sulfate are mixed at the molar ratio of 78:0:22 and a second metal salt solution in which nickel sulfate:cobalt sulfate:manganese sulfate are mixed at the molar ratio of 54:19:27 were prepared. Distilled water 4 liters was poured into a coprecipitation reactor (capacity 4 L, rotation motor power 80 W) and nitrogen gas was supplied into the reactor at the rate of 0.5 liter/min to remove dissolved oxygen followed by stirring at 1000 rpm while keeping the reactor temperature at 50° C.

The first metal salt solution was continuously put into the reactor at the rate of 0.3 liter/hour, and 3.6 M ammonia solution was continuously put into the reactor at the rate of 0.03 liter/hour. Further, for adjusting pH, 4.8 M sodium hydroxide (NaOH) solution was supplied thereto to keep pH at 11. Impeller speed of the reactor was controlled to 1000 rpm such that coprecipitation reaction was performed until the diameter of getting sediment is 1 μm. Average retention time of the solution in the reactor became about 2 hours by controlling flow rate. After reaching the reaction at normal status, normal status duration was given to reactant such that coprecipitation composite with higher density was manufactured.

The first metal salt solution and the second metal salt solution were poured into the reactor with changing mixture ratio at the rate of 0.3 liter/hour, and 3.6 M ammonia solution was put into at the rate of 0.03 liter/hour, 4.8 M NaOH solution was put was supplied for adjusting pH to keep pH at 11. Impeller speed of the reactor was controlled to 1000 rpm, thereby coprecipitation reaction was performed.

The composite was filtered and washed followed by drying in 110° C. hot air dryer for 15 hours, thereby an active material precursor was manufactured.

Aluminum solution $Al(OH)_3$ as M4 was mixed to the manufactured active material precursor followed by heat treatment, thereby a precursor doped with aluminum of 1% concentration was manufactured.

$LiNO_3$ solution as lithium salt was mixed, heated at the rate of 2° C./min and kept at 280° C. for 10 hours for conducting pre-calcination. Then, the result material was calcined at 750° C. for 15 hours to obtain final active material particle. The diameter of the final active material particle was 12 μm.

Comparative Embodiment 1

Particles of a comparison embodiment 1 were manufactured by the example embodiment 1 except for without mixing the aluminum solution.

Example Embodiment 2

For manufacturing particles showing two concentration gradient slopes of metal concentration, first of all, 2.4M metal solution as a first metal salt solution in which nickel sulfate:cobalt sulfate:manganese sulfate were mixed at the molar ratio of 98:0:2, a metal solution as a second metal salt solution in which nickel sulfate:cobalt sulfate:manganese sulfate were mixed at the molar ratio of 91:3:6, and a metal solution as a third metal salt solution in which nickel sulfate:cobalt sulfate:manganese sulfate were mixed at the molar ratio of 63:6:31 were prepared.

The first metal salt solution and the second metal salt solution were poured into the reactor at the rate of 0.3 liter/hour by changing mixture ratio thereof, and the second metal salt solution and the third metal salt solution were introduced into the reactor by changing mixture ratio thereof for conducting coprecipitation reaction, thereby manufacturing precursor particles with two concentration gradient slopes of metal.

Aluminum solution as M4 were mixed into the active material precursor followed by thermal treatment, thereby a precursor doped with 0.5% aluminum were manufactured.

Example Embodiment 3

For manufacturing particles having a concentration gradient portion around a constant concentration core portion, 2.4M metal solution as a first metal salt solution in which nickel sulfate:cobalt sulfate:manganese sulfate were mixed at the molar ratio of 95:1:4 and metal solution as a second metal salt solution in which nickel sulfate:cobalt sulfate: manganese sulfate were mixed at the molar ratio of 55:15:30 were prepared.

The first metal salt solution were supplied in a predetermined time to manufacture a core portion with constant concentration of metal, and the first metal salt solution and the second metal salt solution were introduced into the reactor by changing the mixture ratio thereof for conducting coprecipitation reaction, thereby particles including the concentration gradient portion around the core portion with constant concentration of metal were manufactured.

Aluminum solution as M4 were mixed with the result active material precursor followed by thermal treatment, thereby a precursor doped with 0.3% aluminum were manufactured.

Example Embodiment 4

For manufacturing particles showing two concentration gradient slopes of metal concentration, first of all, 2.4M metal solution as a first metal salt solution in which nickel sulfate:cobalt sulfate:manganese sulfate were mixed at the molar ratio of 98:0:2, a metal solution as a second metal salt solution in which nickel sulfate:cobalt sulfate:manganese sulfate were mixed at the molar ratio of 95:2:3, and a metal solution as a third metal salt solution in which nickel sulfate:cobalt sulfate:manganese sulfate were mixed at the molar ratio of 70:5:25 were prepared.

The first metal salt solution and the second metal salt solution were poured into the reactor at the rate of 0.3 liter/hour by changing mixture ratio thereof, and the second metal salt solution and the third metal salt solution were introduced into the reactor by changing mixture ratio thereof for conducting coprecipitation reaction, thereby manufacturing precursor particles with two concentration gradient slopes of metal.

Aluminum solution were mixed into the active material precursor followed by thermal treatment, thereby a precursor doped with 0.75% aluminum were manufactured.

Comparison Embodiment 2

Particles of a comparison embodiment 2 were manufactured by the example embodiment 4 except for without mixing the aluminum solution.

Test Embodiment 1: Confirmation of Concentration Gradient Structure in the Precursor Particle For confirming each concentration gradient structures of metal as going to the surface from the center of the precursor particles which were manufactured in the example embodiment 1, atomic ratio of each precursor particle manufactured in the example embodiment 1 and the comparative embodiment 1 was measured as moving to the surface from the center using EPMA (Electron Probe Micro Analyzer). The result of the measurement is shown in FIGS. 1 and 2.

Figure 2:
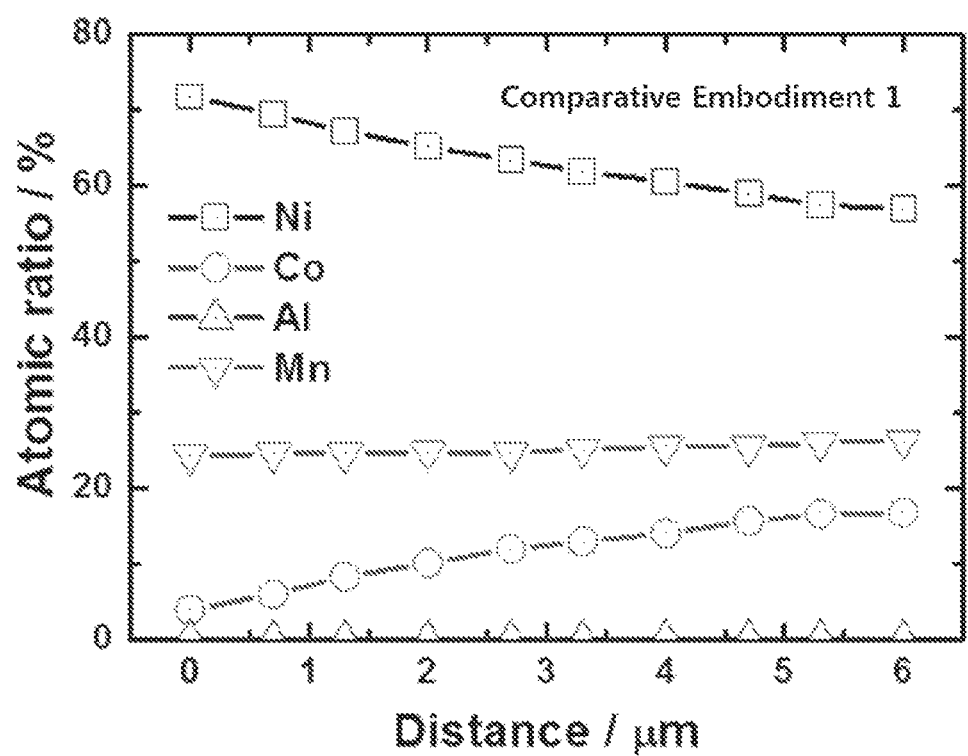

As shown in FIGS. 1 and 2, the precursor manufactured in the example embodiment 1 shows concentration gradient of Al.

<Manufacture Embodiment> Manufacturing Batteries

Batteries were manufactured by using the active material which was manufactured in the example embodiments 1 through 4, and the comparative embodiments 1 and 2.

<Test Embodiment> Measuring Battery Characteristics

Battery characteristics measured from each battery which includes active material manufactured in the example embodiments 1 through 4 and the comparative embodiments 1 and 2 are shown in following table 1.

TABLE 1

| | Capacity (mAh/g) −2.7–4.3 V, 0.1 C | Life Time Property (%) −2.7–4.3, 0.5 C, 100 cycle | DSC (° C.) −4.3 V cut off |
|---|---|---|---|
| Example Embodiment 1 | 187.2 | 97.6 | 288.1 |
| Example Embodiment 2 | 219.9 | 96.8 | 272.3 |
| Example Embodiment 3 | 213.4 | 97.1 | 278.7 |
| Example Embodiment 4 | 223.7 | 95.8 | 260.3 |
| Comparative Embodiment 1 | 189.3 | 96.0 | 280.3 |
| Comparative Embodiment 2 | 225.6 | 93.8 | 250.8 |

Figure 3:
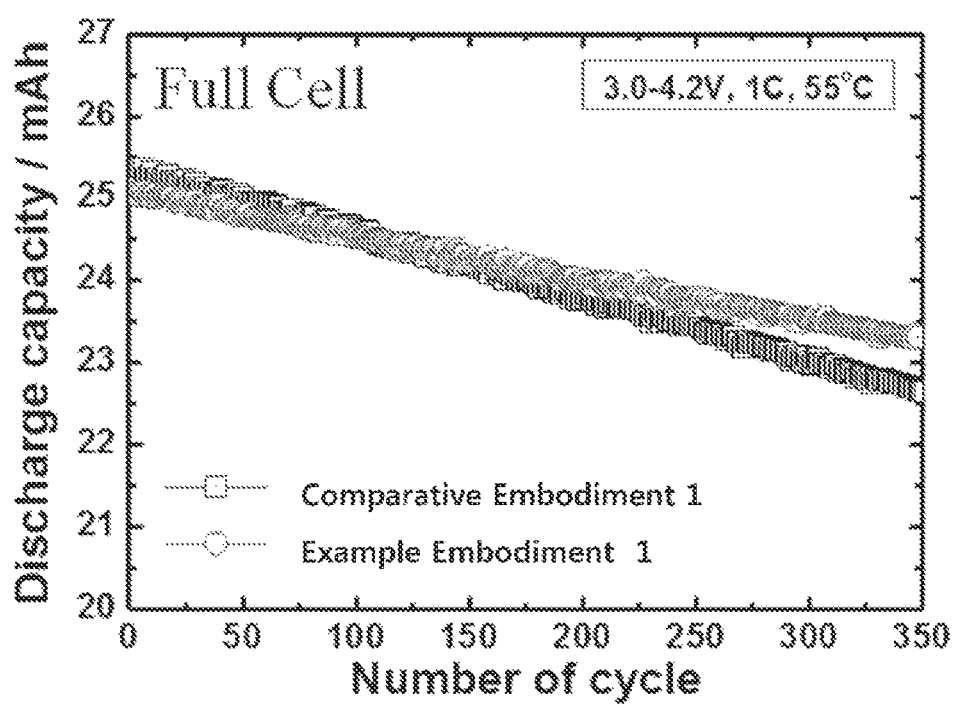
FIGS. 3 through 6 show results of measuring characteristics for batteries which include active material manufactured by embodiments of the inventive concept.
Figure 4:
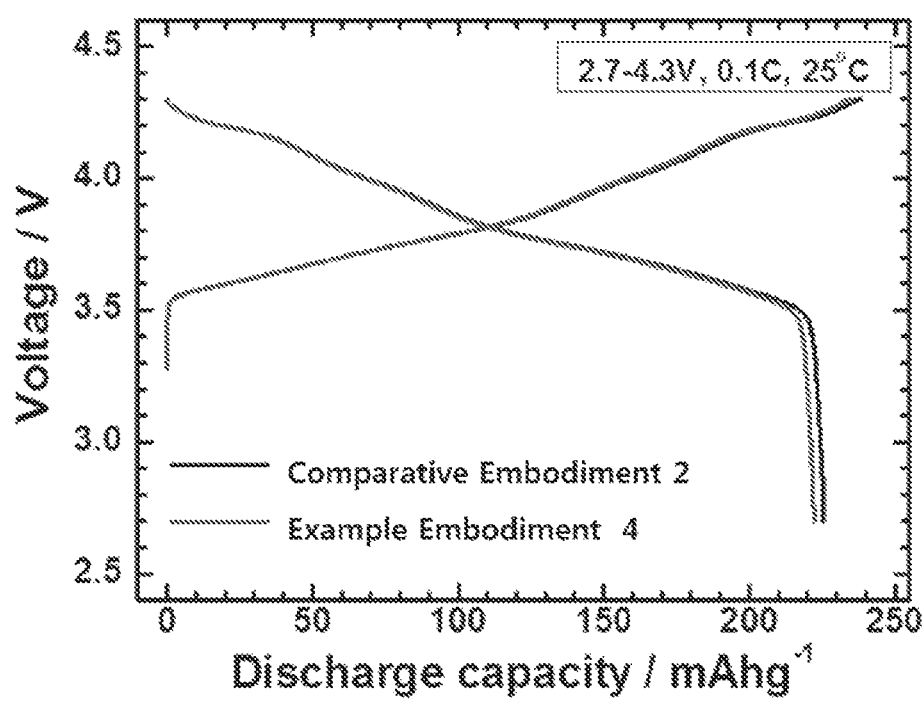

The result of measuring the life time property for the battery which includes active material particles manufactured in the example embodiment 1 and the comparative embodiment 1 are shown in FIG. 3. In FIG. 3, if different metal according to the present embodiment shows concentration gradient, the example embodiment with doping is the same as the comparative embodiment in the initial capacity, however, are higher than the comparative embodiment 1 in the capacity after 150 cycles, thereby it is confirmed that the life time was improved.

Figure 5:
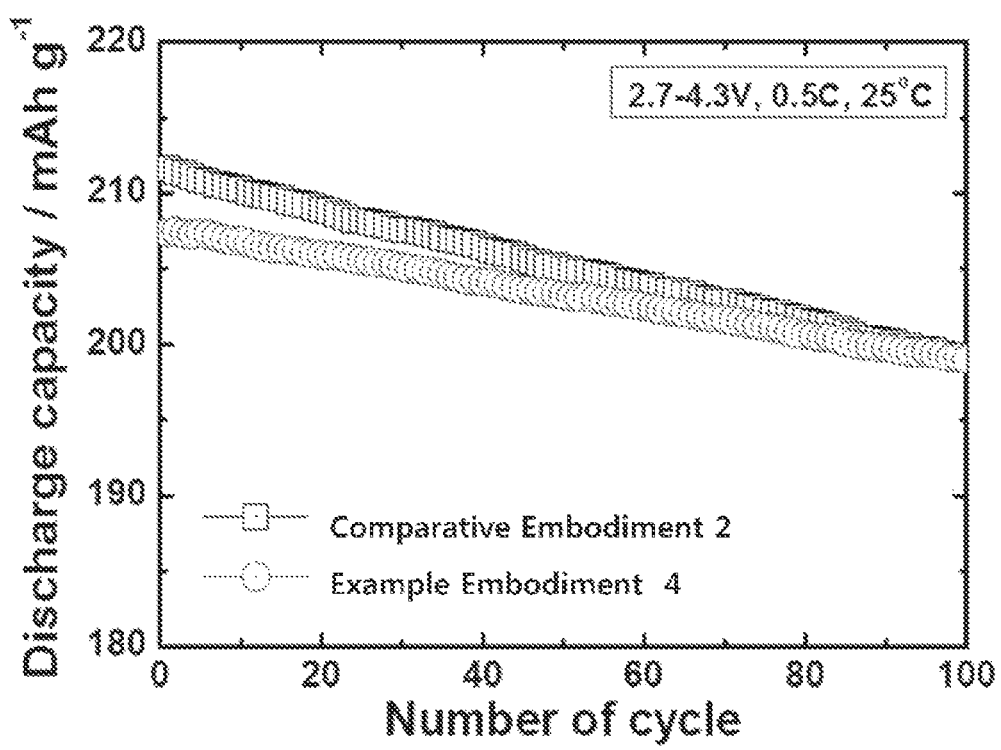
Figure 6:
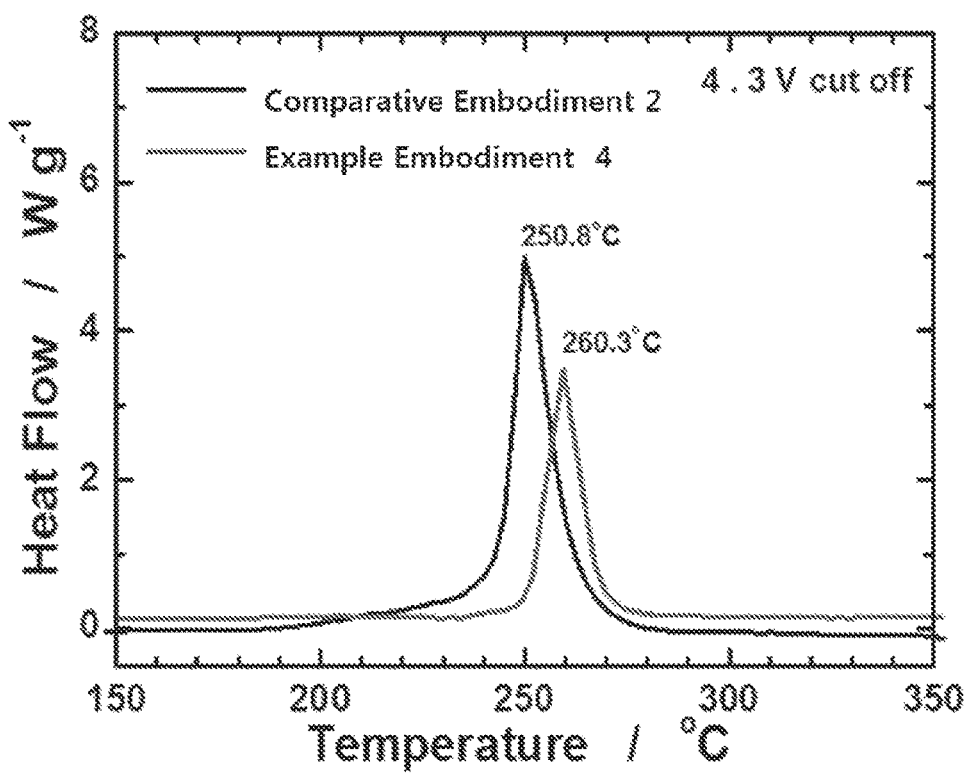

Charge/discharge characteristic, life time property and DSC characteristic were measured from the battery which includes active material particles manufactured in the example embodiment 4 and the comparative embodiment 2. The result was shown in FIGS. 5 through 6. In FIGS. 5 and 6, if different metal according to the present embodiment shows concentration gradient, the example embodiment with doping is the same as the comparative embodiment in the initial capacity but has improved life time property, and has considerably improved thermal stability in FIG. 6.

Example Embodiment 5

For manufacturing particles showing two concentration gradient slopes of metal concentration, first of all, 2.4M metal solution as a first metal salt solution in which nickel sulfate:cobalt sulfate:manganese sulfate were mixed at the molar ratio of 98:0:2, a metal solution as a second metal salt solution in which nickel sulfate:cobalt sulfate:manganese sulfate were mixed at the molar ratio of 92:3:5, and a metal solution as a third metal salt solution in which nickel sulfate:cobalt sulfate:manganese sulfate were mixed at the molar ratio of 67:8:25 were prepared.

The first metal salt solution and the second metal salt solution were poured into the reactor at the rate of 0.3 liter/hour by changing mixture ratio thereof, and the second metal salt solution and the third metal salt solution were introduced into the reactor by changing mixture ratio thereof for conducting coprecipitation reaction, thereby manufacturing precursor particles with two concentration gradient slopes of metal.

Titanium solution were mixed into the active material precursor followed by thermal treatment, thereby a precursor doped with 0.75% titanium were manufactured.

Example Embodiment 6

For manufacturing particles having a concentration gradient in entire portion as going to the surface from the center, 2.4M metal solution as a first metal salt solution in which nickel sulfate:cobalt sulfate:manganese sulfate were mixed at the molar ratio of 90:0:10 and metal solution as a second metal salt solution in which nickel sulfate:cobalt sulfate:manganese sulfate were mixed at the molar ratio of 54:15:31 were prepared.

The first metal salt solution were supplied in a predetermined time to manufacture a core portion with constant concentration of metal, and the first metal salt solution and the second metal salt solution were introduced into the reactor by changing the mixture ratio thereof for conducting coprecipitation reaction, thereby particles with the concentration gradient of metal in the entire portion as going to the surface from the center were manufactured.

Titanium solution as M4 were mixed with the result active material precursor followed by thermal treatment, thereby a precursor doped with 0.3% titanium were manufactured.

Example Embodiment 7

For manufacturing particles showing two concentration gradient slopes of metal concentration, first of all, 2.4M metal solution as a first metal salt solution in which nickel sulfate:cobalt sulfate:manganese sulfate were mixed at the molar ratio of 98:0:2, a metal solution as a second metal salt solution in which nickel sulfate:cobalt sulfate:manganese sulfate were mixed at the molar ratio of 90:3:7, and a metal solution as a third metal salt solution in which nickel sulfate:cobalt sulfate:manganese sulfate were mixed at the molar ratio of 70:5:25 were prepared.

The first metal salt solution and the second metal salt solution were poured into the reactor at the rate of 0.3 liter/hour by changing mixture ratio thereof, and the second metal salt solution and the third metal salt solution were introduced into the reactor by changing mixture ratio thereof for conducting coprecipitation reaction, thereby manufacturing precursor particles with two concentration gradient slopes of metal.

Titanium solution were mixed into the active material precursor followed by thermal treatment, thereby a precursor doped with 1.0% titanium were manufactured.

Example Embodiment 8

For manufacturing particles having a core portion with constant concentration and a shell portion with concentration gradient around the core portion, 2.4M metal solution as a first metal salt solution in which nickel sulfate:cobalt sulfate:manganese sulfate were mixed at the molar ratio of 98:0:2 and metal solution as a second metal salt solution in which nickel sulfate:cobalt sulfate:manganese sulfate were mixed at the molar ratio of 90:3:7 were prepared.

The first metal salt solution were supplied in a predetermined time to manufacture a core portion with constant concentration of metal, and the first metal salt solution and the second metal salt solution were introduced into the reactor by changing the mixture ratio thereof for conducting coprecipitation reaction, thereby particles including the shell portion with concentration gradient of metal around the core portion.

Titanium solution as M4 were mixed with the result active material precursor followed by thermal treatment, thereby a precursor doped with 0.25% titanium were manufactured.

Comparative Embodiment

Particles of comparative embodiments 3 and 4 were manufactured by the example embodiments 5 and 6 except for without mixing the titanium solution.

Test Embodiment: Confirmation of Concentration Gradient Structure in the Active Material Particle For confirming each concentration gradient structure of metal as going to the surface from the center of the precursor particles which were manufactured in the example embodiment 5 and the comparative embodiment 3, atomic ratio of each precursor particle manufactured in the example embodiment 1 and the comparative embodiment 1 was measured as moving to the surface from the center using EPMA (Electron Probe Micro Analyzer). The result of the measurement was shown in FIGS. 7 and 8.

Figure 7:
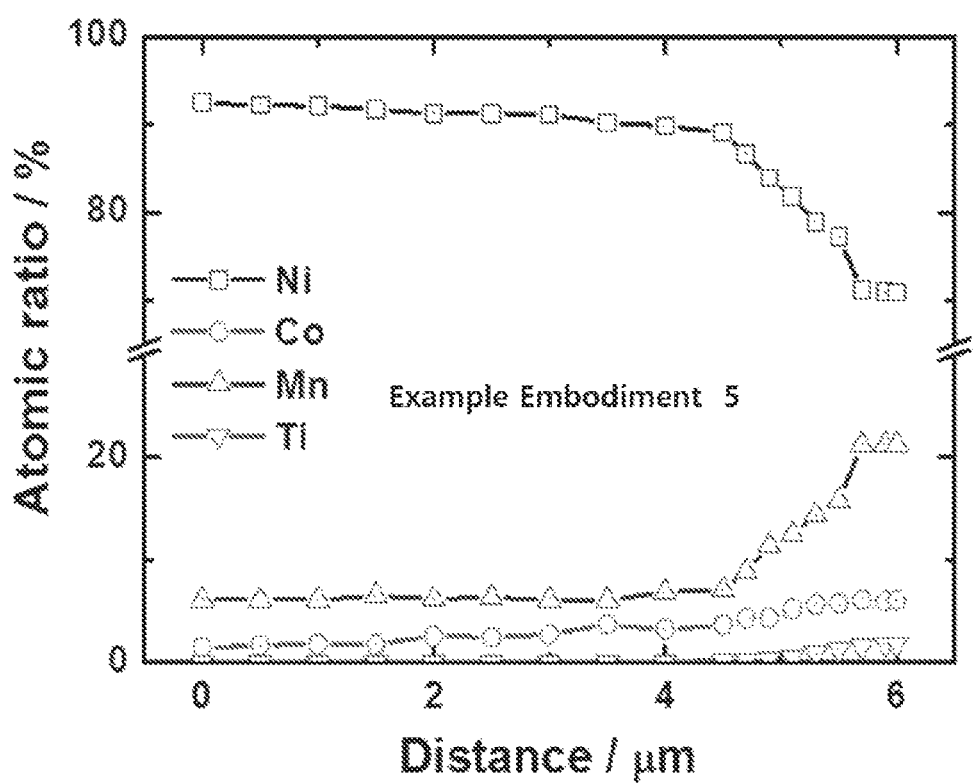
FIGS. 7 and 8 show results of measuring the element ratio in active material by EPMA as moving from the center to the surface.
Figure 8:
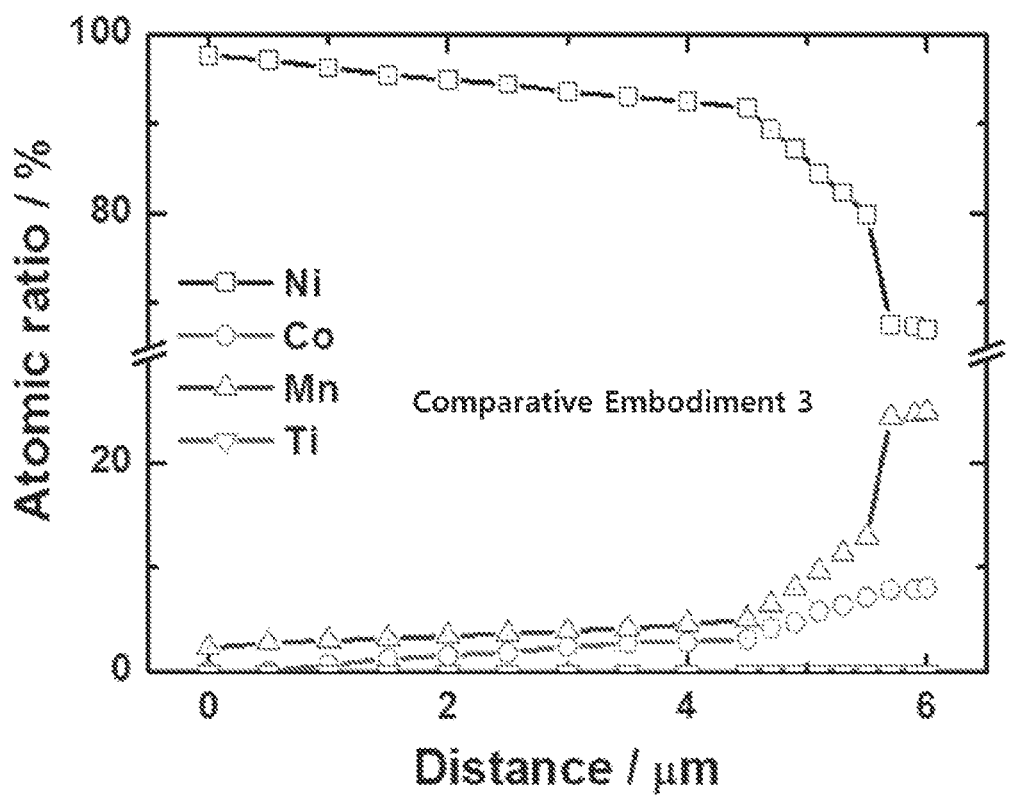

As shown in FIGS. 7 and 8, the precursors manufactured in the example embodiment 5 and the comparative embodiment 3 show concentration gradients of Ni, Co and Mn from the center to the surface of the particle, and it is confirmed that the doped Ti in the embodiment 5 also shows concentration gradient.

<Test Embodiment> Measuring Battery Characteristics

Battery characteristics measured from each battery which includes active material manufactured in the example embodiments 5 through 9 and the comparative embodiments 3 and 4 are shown in following table 2.

TABLE 2

| | Capacity (mAh/g) −2.7-4.3 V, 0.1 C | Life Time Property (%) −2.7-4.3, 0.5 C, 100 cycle | DSC (° C.) −4.3 V cut off |
|---|---|---|---|
| Example Embodiment 5 | 222.8 | 95.2 | 261.7 |
| Example Embodiment 6 | 193.1 | 96.3 | 290.0 |
| Example Embodiment 7 | 220.6 | 95.4 | 267.3 |
| Example Embodiment 8 | 225.8 | 94.1 | 251.1 |
| Comparative Embodiment 2 | 225.1 | 92.1 | 250.8 |
| Comparative Embodiment 3 | 194.3 | 95.5 | 282.1 |

Figure 9:
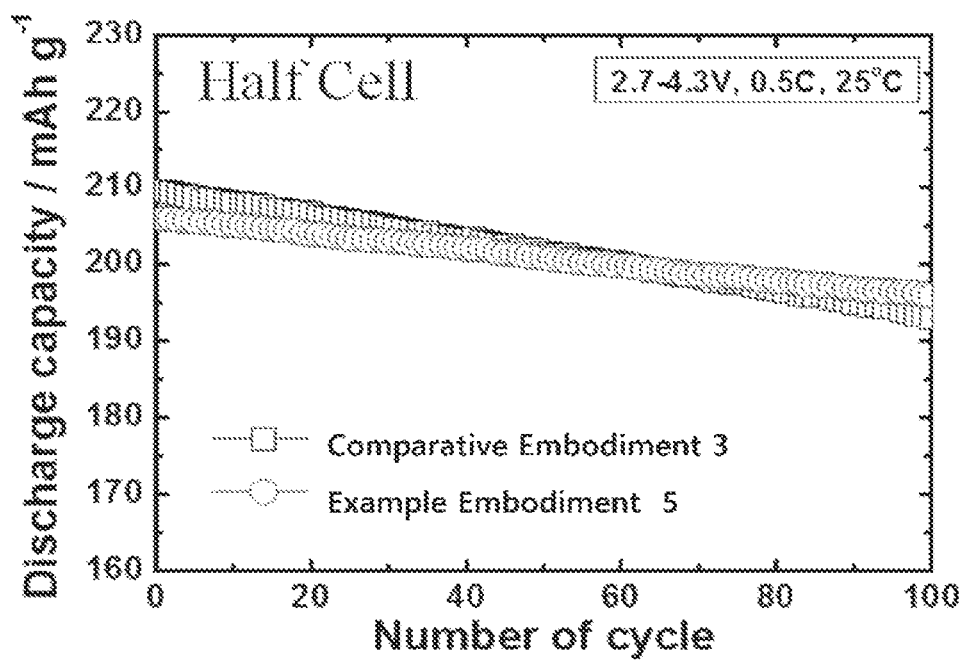
FIGS. 9 and 10 show results of measuring characteristics for batteries which include active material manufactured by embodiments of the inventive concept.

The result of measuring the life time property for the battery which includes active material particles manufactured in the example embodiment 5 and the comparative embodiment 3 are shown in FIG. 9. As shown in FIG. 9, a particle with concentration gradient of different metal manufactured by the present embodiment is the same as the comparative embodiment in the initial capacity, however, is higher than the comparative embodiment 1 in the capacity after 60 cycles, thereby it is confirmed that the life time was improved.

Figure 10:
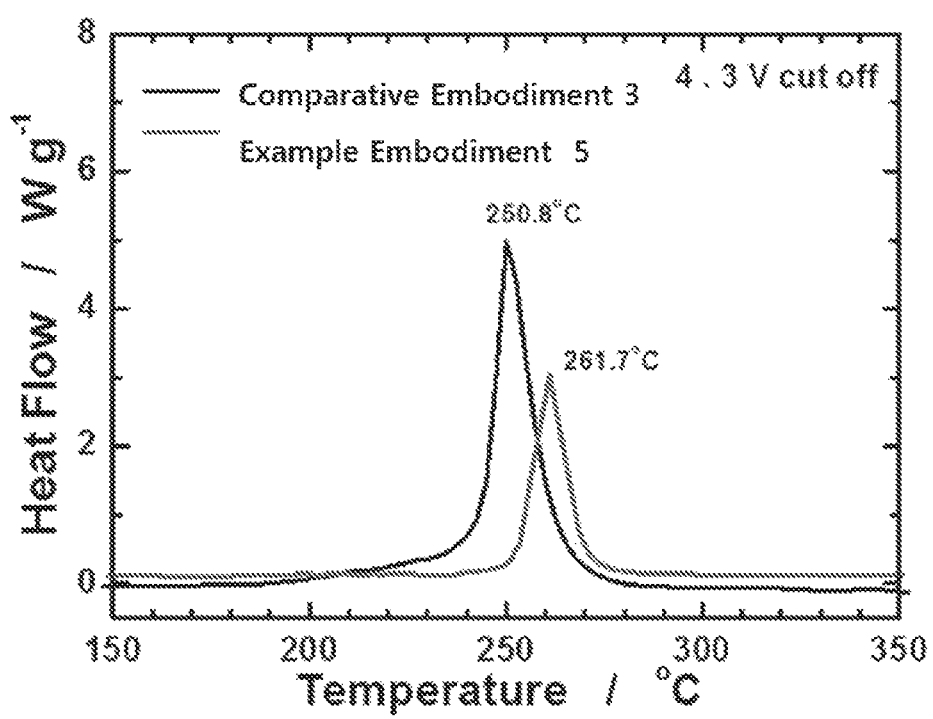

As shown in FIG. 10, it is confirmed that a particle with concentration gradient of different metal manufactured by the present embodiment is more improved than the comparative embodiment in thermal stability.

According to embodiments of the inventive concept, the cathode active material for lithium battery may show concentration gradient of different metal which is coated or coating as well as concentration gradient of Ni, Mn and Co such that the cathode active material is more structurally stable. Therefore deterioration can be restrained during high temperature preservation and heat stability is superior during charging.

The cathode active material for lithium battery according to present embodiments is more stable in structural because different metal as well as Ni, Mn and Co shows concentration gradients, thereby deterioration can be restrained during high temperature preservation and heat stability is superior during charging.

What is claimed is:

1. A cathode active material for a lithium secondary battery, the cathode active material comprising:
a first region represented by following Chemical Formula 1, wherein concentrations of M1, M2 and M3 are constant, and wherein the first region is a core with radius R1; and
a second region formed around the first region, wherein a thickness of the second region is D2, and wherein concentrations of M1, M2, M3 and M4 are changed from the composition shown in the Chemical Formula 1 into the following composition shown in Chemical Formula 2, thereby the second region shows the composition of the Chemical Formula 2 at the outer shell, $$Li_{a1}M1_{x1}M2_{y1}M3_{z1}O_{2+\delta}$$ [Chemical Formula 1]

$$Li_{a2}M1_{x2}M2_{y2}M3_{z2}M4_wO_{2+\delta}$$ [Chemical Formula 2]

(wherein in Chemical Formula 1 and Chemical Formula 2, each of M1, M2 and M3 is selected from the group consisting of Ni, Co, Mn and combinations thereof, M4 is Al, $0<a1\leq1.1$, $0<a2\leq1.1$, $0\leq x1\leq1$, $0\leq x2\leq1$, $0\leq y1\leq1$, $0\leq y2\leq1$, $0\leq z1\leq1$, $0\leq z2\leq1$, $0.003\leq w\leq0.0075$, $0.0\leq\delta\leq0.02$, $0<x1+y1+z1\leq1$, and $0<x2+y2+z2\leq1$).

2. The cathode active material of claim 1, wherein M4 shows concentration gradient in at least a portion of a particle.

3. The cathode active material of claim 1, wherein M4 shows concentration gradient from a portion of the second region to the outer shell of the second region.

4. The cathode active material of claim 3, wherein the concentration of M4 increases as going to the outer shell of the second region from a portion of the second region.

5. The cathode active material of claim 1, wherein $x1\neq c2$, $y1\neq y2$ and $z1\neq z2$.

6. The cathode active material of claim 1, wherein the concentration gradients of M1, M2 and M3 are constant in the second region.

7. The cathode active material of claim 1, wherein the second region comprises a region M1-1 and a region M1-2 of which concentration gradients of M1 are different from each other.

8. The cathode active material of claim 1, wherein the second region comprises a region M2-1 and a region M2-2 of which concentration gradients of M2 are different from each other.

9. The cathode active material of claim 1, wherein the second region comprises a region M3-1 and a region M3-2 of which concentration gradients of M3 are different from each other.

10. The cathode active material of claim 1, wherein at least one of M1, M2, and M3 has constant concentration gradient at an entire region which has concentration gradient of M4.

11. A cathode active material for a lithium secondary battery, wherein average composition of total particles are represented by following Chemical Formula 4, $$Li_aM1_xM2_yM3_zM4_wO_{2+\delta},$$ [Chemical Formula 4]

wherein each of M1, M2 and M3 is selected from the group consisting of Ni, Co, Mn and combinations thereof, wherein M4 is Al, and wherein at least one of M1, M2 and M3 has concentration gradient in at least a portion of the particle, and wherein $0\leq x\leq1$, $0\leq y\leq1$, $0\leq z\leq1$, $0.003\leq w\leq0.0075$ and $0.0\leq\delta\leq0.02$.

12. The cathode active material of claim 11, wherein at least one of M1, M2 and M3 shows concentration gradient in the whole particle.

13. The cathode active material of claim 11, wherein one of M1, M2 and M3 shows constant concentration in the whole particle.

14. The cathode active material of claim 11, wherein M4 shows concentration gradient in at least a portion of the particle.

15. The cathode active material of claim 11, wherein concentration of M4 decreases as going to the center of the particle from the surface of the particle.

16. The cathode active material of claim 11, wherein at least one of M1, M2 and M3 has constant concentration gradient at an entire region which has concentration gradient of M4.

\* \* \* \* \*